May 15, 1951 E. A. ROCKWELL 2,553,210
FOLLOW-UP SERVOMOTOR
Original Filed June 29, 1943 4 Sheets-Sheet 1

INVENTOR
Edward A. Rockwell
BY Arthur Wright
ATTORNEY

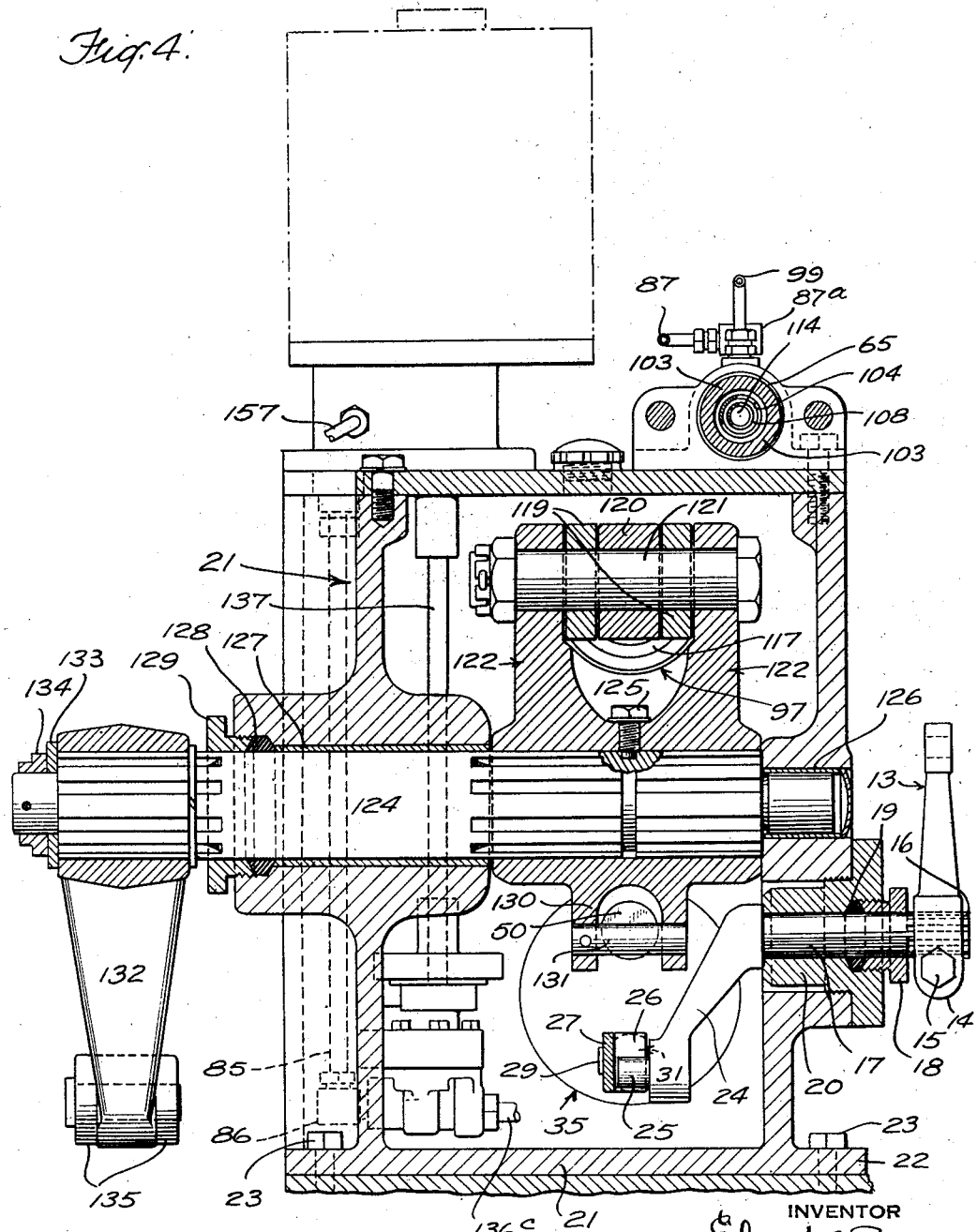

Patented May 15, 1951

2,553,210

UNITED STATES PATENT OFFICE 2,553,210

FOLLOW-UP SERVOMOTOR

Edward A. Rockwell, Cleveland, Ohio

Original application June 29, 1943, Serial No. 492,745, now Patent No. 2,458,736, dated January 11, 1949. Divided and this application October 28, 1944, Serial No. 560,868

5 Claims. (Cl. 121—41)

My invention relates particularly to a self-contained power operated servo mechanism for controlling any device requiring a relatively large amount of work to move the same. Also, it is especially adapted for use where small follow-through manual operating input forces are required either by mechanical connections to the input or by other connections thereto, such for example as in the control of automotive vehicles, airplanes, steam engines, steering gears or locomotive reverse gears.

The present application is a division of my application upon Self-Contained Hydraulic Servo Mechanism, Ser. No. 492,745, filed June 29, 1943, Patent No. 2,458,736, granted January 11, 1949.

The object of my invention is particularly to provide a power-driven apparatus of the above character, for controlling any desired device. One of the objects is to provide a hydraulic power operated mechanism which is positive, certain and accurate in operation and which eliminates the disadvantages in previous valve-operating devices. A further object is to provide a power-driven valve-operating mechanism which operates effectively upon the principle of hydraulic pressure and volume displacement between the control mechanism and the output power members. Also, one-way check valves may be used in the high pressure lines leading to the valves to prevent reversibility in the output members. Furthermore, I have found it advantageous to utilize hydraulic pressures obtained from a manually operated master cylinder to maintain the coordination of travel between the input means and the output means. The results obtained are facilitated by the very slight travel of the valves, which assists in providing accurate increments of fluid for the control of the output means. This arrangement makes it feasible to provide an efficient hydraulic remote control whereby an accurate control may be readily obtained. Also, the master cylinders used are provided with suitable liquid compensation in order to maintain the phase relation between the control means and the output means. Still another object is to provide a remotely controlled power unit for controlling or operating mechanisms in which the power unit is a compact self-contained power unit.

In accordance with my invention, with the high hydraulic pressures available, cylinders of relatively small displacement can be used for controlling the output. These can be most conveniently mounted upon a box section housing and opposed to each other. Pistons are connected by push rods to an output shaft trunnioned in the housing. The pivot of the crank shaft and output lever can be located at the same point that the lifting or tumbling shaft is located, and the whole unit mounted together. Monitor or travel control cylinders and pistons are mounted on either side below the output shaft, and adapted to rest removably against a pin fixed on an extension of the crank attached to said shaft. Control master cylinders, in one form, are located below the monitor and are preferably bored in the same casting. The pistons are positively connected by links to an independent crank journaled in the housing and having a control lever positioned on the outside of the box for convenient attachment to the reach rod or other control. The interior of the box acts as a supply reservoir for the oil in which the gear pump and cylinder openings are submerged, so as to receive the return flow from the valves. The pump is mounted on a bracket extending down from the cover plate to which the air motor is also secured. The valves and pressure controller are also mounted on the cover plate together with a tube connection from the pump outlet, making a complete sub-assembly, so that these parts can be conveniently removed from the box. External pipe connections are made from each master-monitor outlet to the respective valve cylinder outlet. Air bleeders are provided at the high point of these connections. Preferably check valves are placed in the lines leading from the pump and the controller to each of the valves to make the action irreversible. Lines also connect with outlets from these valves to the respective power cylinders. Air bleeders are provided at the top of these cylinders to initially exclude all air and to allow for the initial cycling of the unit.

Further objects of my invention will appear from the detailed description of the same hereinafter.

While my invention is capable of being carried out in many different ways for the purpose of illustration I have shown only certain embodiments of my invention in the accompanying drawings, in which Fig. 1 is a diagrammatic side elevation of a locomotive reverse gear controlling mechanism operated in accordance with my invention;

Fig. 4 is a transverse section of the same taken on line 4—4 of Fig. 2;

Fig. 5 is a vertical section of a check valve on the high pressure inlet to one of the modulator valves.

Figure 1:
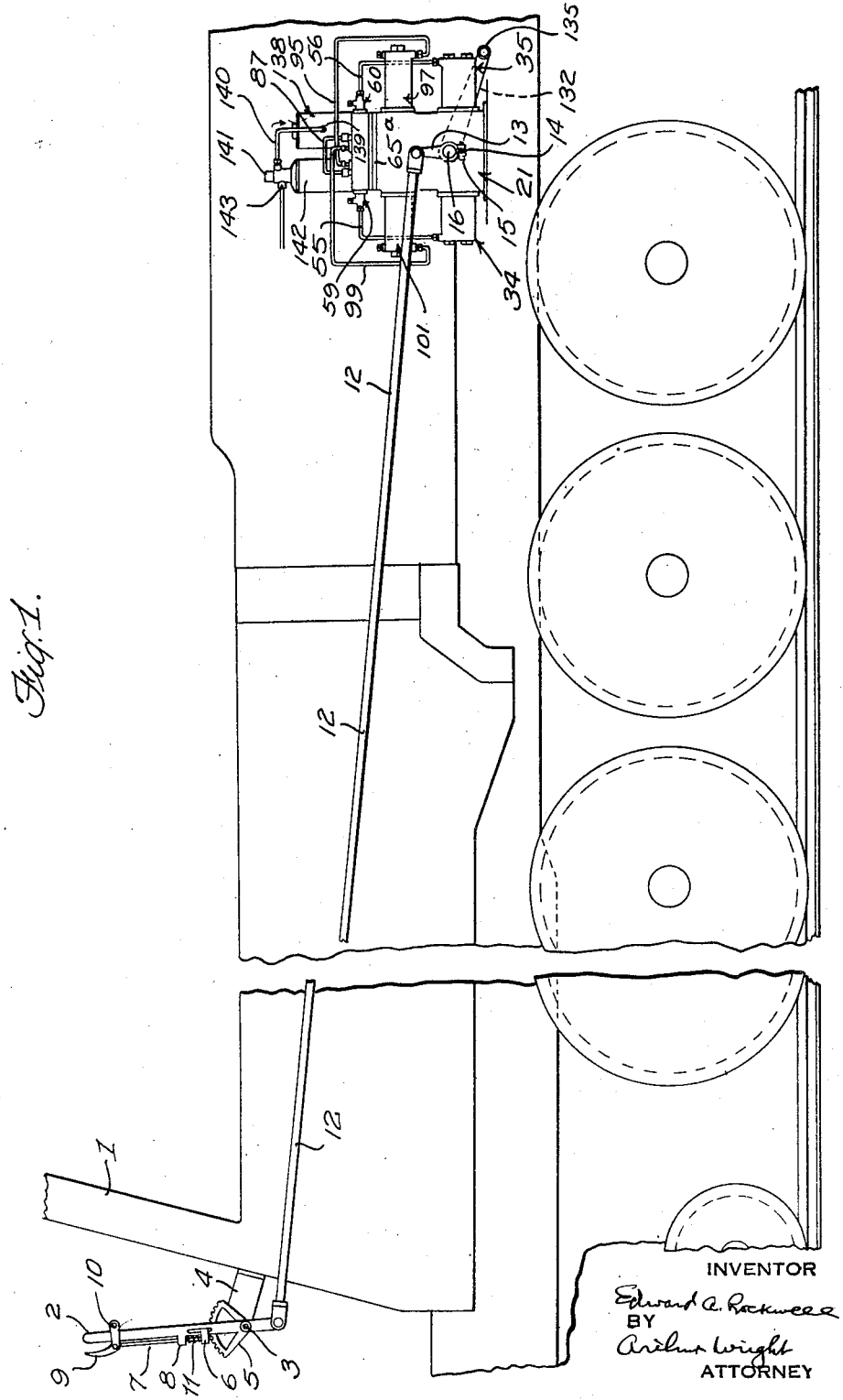
Figure 2:
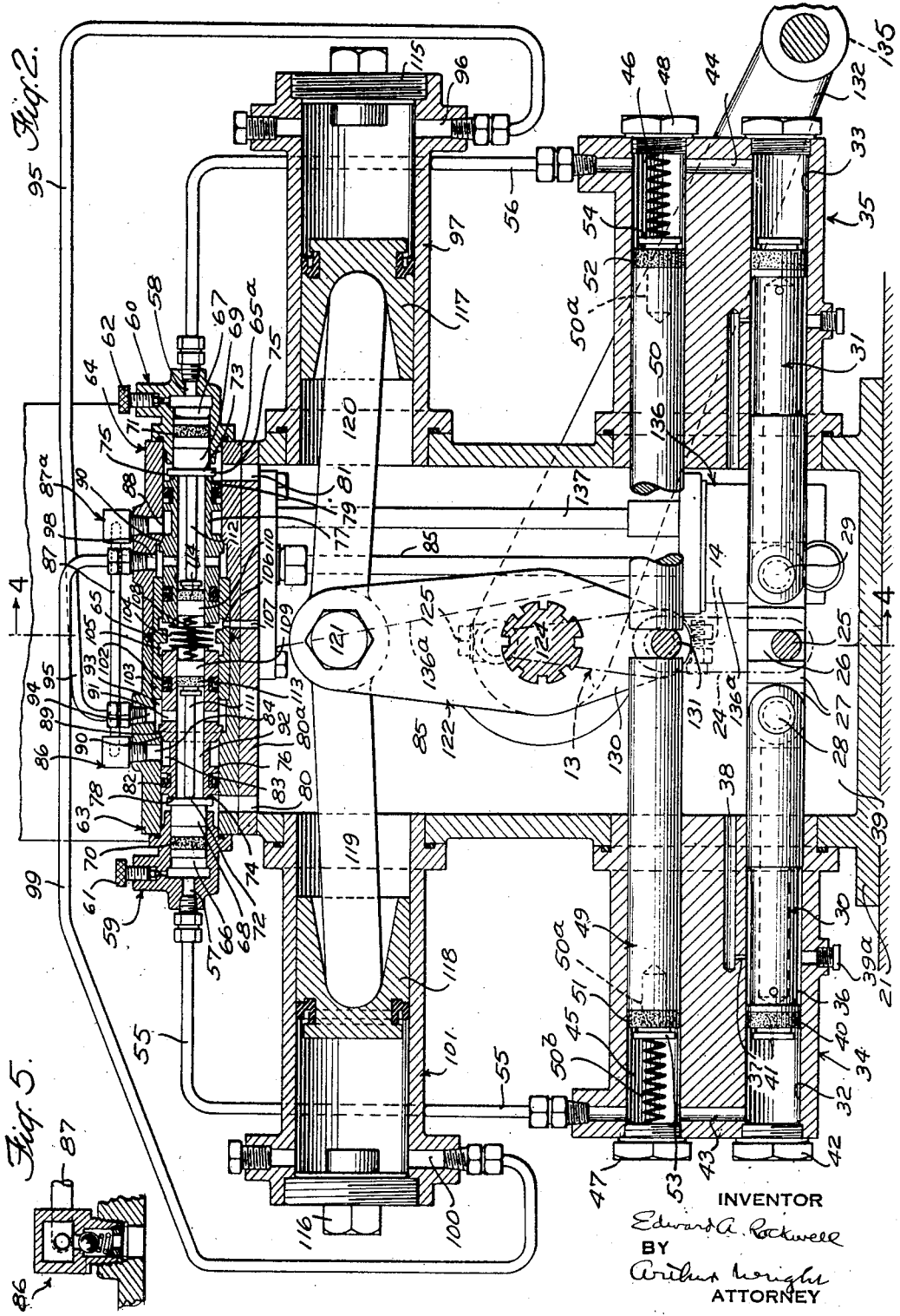
Fig. 2 is a longitudinal vertical section of the valves and operating cylinders used therein.
Figure 3:
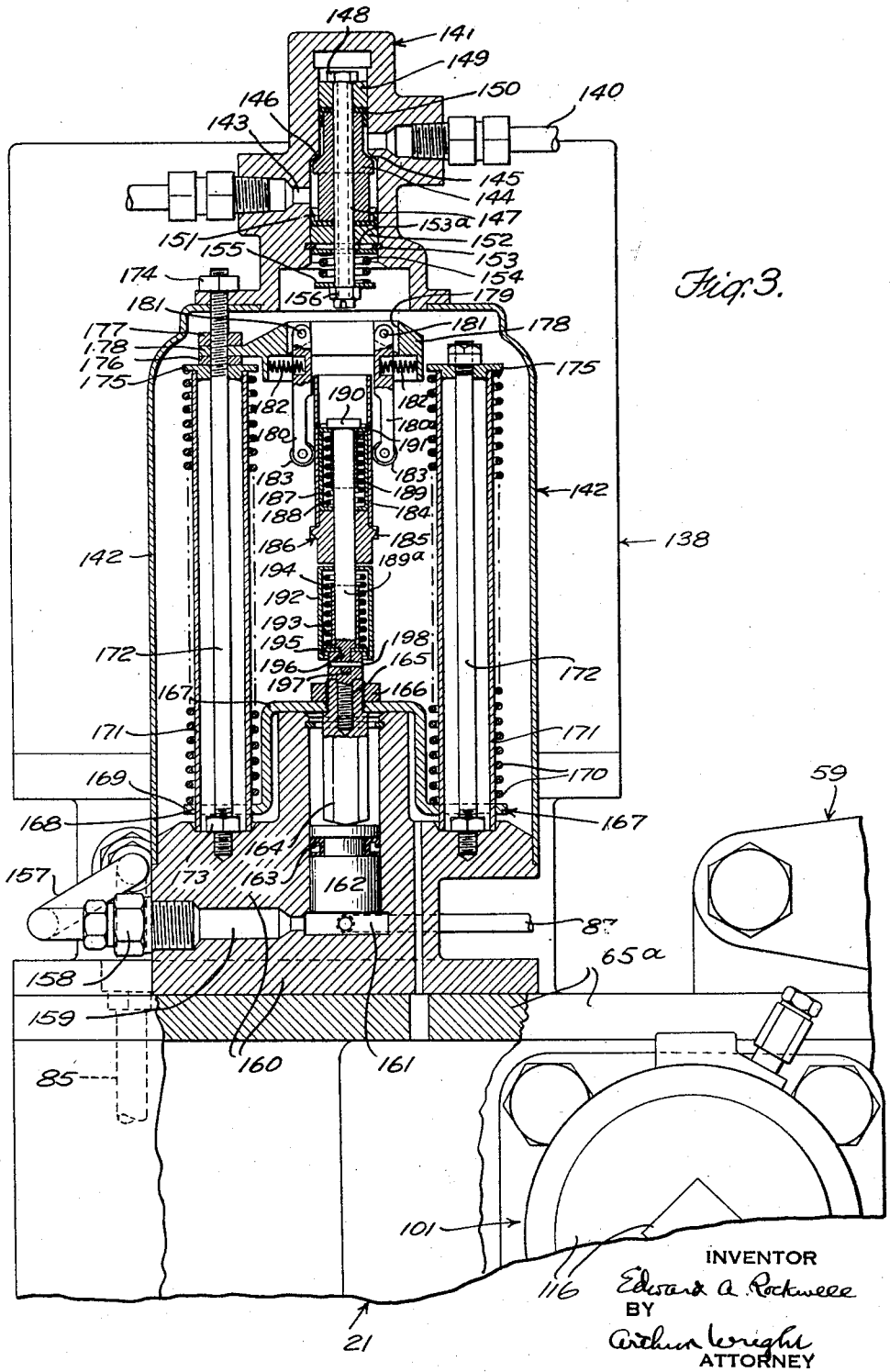
Fig. 3 is an end elevation, partly in section, of the same.

Referring first to the form of my invention shown in Figs. 1 to 4, I have shown in a steam locomotive cab 1 a hand operated lever 2 carried by a pivot 3 on a bracket 4 attached to said cab. Said bracket 4, furthermore, has attached thereto a segmental rack 5 to cooperate with a sliding catch 6 mounted on the lever 2, to which there is attached a rod 7 passing through a projection 8 on a lever 2 and connected to a bifurcated hand operating lever 9 having a pivot 10 on said hand lever 2. A spring 11 around the rod 7 and located beneath the projection 8 normally keeps the catch 6 in engagement with any one of the notches of the rack 5. Attached to the lower end of the hand lever 2 there is a link or reach rod 12 which is pivoted to the upper end of a manually operated lever 13 having a split end 14 adapted to be tightened in place by a screw 15 on a splined end 16 of a master cylinder operating shaft 17 which passes through a gland nut 18 having a packing 19 carried by a large assembly bushing 20 screw-threaded into a cylinder housing 21 having a supporting flange 22 for attaching the same by screws 23 to any desired part of the locomotive. The inner end of the master cylinder shaft 17 has thereon a crank 24 provided with a lateral crank pin 25 so as to be received in a recess 26 in a link 27 having pivots 28 and 29 connected to the master cylinder pistons 30 and 31, respectively, carried in master cylinders 32 and 33 in master cylinder blocks 34 and 35, respectively. The cylinder blocks 34 and 35 are attached to the side of the cylinder casing 21 in any desired manner. As the two master cylinders are constructed in the same way only one thereof will be described. The master cylinder plunger 30 has around its periphery an annular chamber 36 which communicates by a port 37 with a pasageway 38 in the cylinder block 34 and which leads to a central chamber 39 in the cylinder casing 21. The port 37 also serves for liquid compensation of the cylinder 32 at the end of the path of the piston 40. The annular chamber 36 has a hole closed by a plug 39a to enable the port 37 to be drilled. A rubber U-shaped seal 40 is provided on the piston 30 to the right of a flange 41 on the end of said piston. Also, the cylinder 32 has a screw cap 42.

The cylinders 32 and 33 have discharge ports 43 and 44 which lead, respectively, to travel control cylinders 45 and 46, closed by screw caps 47 and 48, and which have therein travel control plungers 49 and 50 having a recess 50a for a plunger return spring 50b. These two travel control plungers have U-shaped rubber seals 51 and 52 adjacent to flange heads 53 and 54 thereon. The hydraulic liquid discharged under manual pressure from the chamber 32 and 33, respectively, after reaching the cylinders 45 and 46, is delivered by pipes 55 and 56 to inlet ports 57 and 58 in valve cylinder heads 59 and 60, respectively, having air bleeder screws 61 and 62. The cylinder heads 59 and 60 are located, respectively, on valve cylinders 63 and 64 joined together with a packing 65 and fastened in any desired way on the top of a cover plate 65a on top of the cylinder housing 21. The cylinder heads 59 and 60, furthermore, have within the same, respectively, chambers 66 and 67 having therein plungers 68 and 69 provided with U-shaped seals 70 and 71. The said plungers 68 and 69, also, have thereon heads 72 and 73 which provide valve seats 74 and 75 for cooperating with tubular valves 76 and 77 provided with annular valve elements 78 and 79 cooperating with the valve seats 74 and 75. The valve 74, 78 acts as a discharge valve communicating with a discharge port 80 in the valve cylinder housing 21 through the cover plate 65a on the housing 21. Similarly the valve 75, 79 communicates with a similar port 81 communicating with said chamber 39. The tubular valve members 76 and 77 are constructed just alike and only one thereof will be described in detail accordingly. The tubular valve 76 has an annular seal 82 and a peripheral valve-balancing chamber 83 communicating with an inlet port 84 connected to a high presure hydraulic liquid inlet pipe 85 provided with a check valve 86. A branch high pressure hydraulic liquid inlet pipe 87, having a check valve 87a, leads to a similar inlet 88 on the valve cylinder 64. The said tubular valve 76, furthermore, has a conical inlet valve 89 cooperating with a valve seat 90 on the inside of the valve cylinder 63. Also, said tubular valve 76 has a plurality of radial apertures 91 connecting with a cylindrical chamber 92 in the tubular valve 76 and with a chamber 93 on the outside of the tubular valve 76 which leads to a port 94 for supplying the modulated high pressure liquid which passes through the valve 90, 89 to a pipe 95 and thence to an inlet port 96 on a power cylinder 97. Similarly, the valve cylinder 64 has a delivery outlet aperture 98 for the liquid delivered by the valve 77 which is thence conveyed by a pipe 99 to an inlet opening 100 on a power cylinder 101. The tubular valve 78, furthermore, has an annular seal 102 within a sleeve 103. Also, between the inner ends of the tubular valves 76 and 77, which are individually self-lapping, there is a coil spring 104 for pressing the conical valves 89 against their seats 90. The spring 104 is located in a chamber 105 which communicates by a port 106 in the sleeve 103 and a passageway 107 with the chamber 39. The passageway 107 serves as a breather opening. An internal spring 108 between pistons 109 and 110, located within the tubular valves 76 and 77, serves, by means of piston rods 111 and 112 on said pistons 109 and 110 and attached to the heads 72 and 73 respectively, to unseat the valves 74 and 75 normally. Also, it will be noted that the pistons 109 and 110 and the attached plunger heads 72 and 73 serve to balance the release valves 74, 78 and 75, 79. Rubber seals 113 and 114 are located on the piston rods 111 and 112.

The power cylinders 97 and 101 are provided with screw caps 115 and 116. Pistons 117 and 118 and piston rods 119 and 120 are connected to a pivot 121 on a lever arm 122, which is in the form of a yoke carrying said pivot 121. The lever arm 122, furthermore, is carried upon a splined shaft 124 having a locking screw 125. The shaft 124 is carried within bushings 126 and 127 in the cylinder housing 21 and a packing 128 is located adjacent to the bushing 127 and held in place by a gland nut 129. Furthermore, the lever 122 has a downwardlly directed bifurcated end 130 provided with a cross pin 131 which is located between the inner ends of the two travel control plungers 49 and 50.

On the outer end of the shaft 124 there is a lever arm 132 fastened in place with a washer 133 and a nut 134. The lower end of the lever arm 132 is pivoted to a yoke 135 of a locomotive reverse gear such as is shown, for example, in Fig. 5, and for operating any desired type of locomotive reverse gear, such as is shown in Marks, Mechanical Engineers Handbook, first edition, 1916, pages 975 and 977, published by McGraw-Hill Book Co. Inc., New York.

The high pressure liquid supplied by the pipe 85 to the tubular valve 76, 77 is delivered from a gear pump 136 of any desired type, mounted on a bracket 136a on the cover plate 80a so as to receive liquid from the chamber 39 by the usual inlet opening, which is driven by a shaft 137, which shaft in turn is driven by an air vane or other motor 138, as shown in Fig. 1. However, it may be an electric motor, as shown in my Patent No. 2,292,546, upon Snap Action Apparatus. The motor 138, which is fastened to the cover plate 65a, may be driven by compressed air received through an opening 139 from a pipe 140 which leads to a fitting 141 on the top of a pressure accumulator casing 142, also fastened to the cover plate 65a, having a compressed air inlet opening 143. The supply of compressed air to the pipe 140 is controlled by a valve plunger 144 having a conical valve member 145 cooperating with a valve seat 146 on the interior of the fitting 141. The valve 145, 146 is normally unseated. For this purpose, the valve plunger 144 has a longitudinal passageway to receive a bolt 147, on one end of which there is a head 148 adjacent to an annular spacing plunger 149 to hold in place a rubber seal 150. The other end of the bolt 147 passes through a seal 151 and a spacing member 152 and thence through a washer 152a and a split retainer ring 153 and a washer 153a in the fitting 141 against the lower face of which there is provided a coil spring 154 held in place by a washer 155 and a nut 156. The supply of compressed air from the inlet 143 to the port 140 is adapted to be cut off automatically when there is a sufficient accumulation of pressure in the hydraulic liquid in the system so as to interrupt the operation of the gear pump 136. For this purpose, the pipe 85 has a branch pipe 157 which leads by a fitting 158 to a passageway 159 in a base block 160 to which the accumulator casing 142 is secured. The passageway 159 leads to a plunger chamber 161 having a plunger 162 therein provided with an annular seal 163. The plunger 162 operates against a screw head 164 which is located over a snap action screw 165 where it is held in place by a nut 166 so as to support a dished plate 167 having a series of openings 168 in a flange 169 thereon which supports a plurality of coil springs 170 around tubes 171 within the holes 168. The tubes 171 receive through the same locking bolts 172 which hold the casing 142 against the block 160 by being screw-threaded into said block and having their ends provided with nuts 173 and 174 so as, also, to hold the fitting 141 on the casing 142. At their upper ends the coil springs 170 are retained in place by washers 175 on the rods 172 and adjacent to said washers 175, nuts 176 and 177 hold in place a spider 178. The said spider 178 has a central aperture 179 adjacent to which there are a plurality of pivoted arms 180, carried on pivots 181 and pressed inwardly by springs 182. The lower ends of the arms 180 have pivoted therein rollers 183 to bear on the outside of a tubular member 184 having secured thereto a peripheral flange 185 located on a snap action block 186. Within the tubular member 184 there is a spring retainer sleeve 187 carrying within the same a coil spring 188 located on the outside of a sleeve 189. The sleeve 189 is located on a snap action rod 189a which at this end has a head 190 adjacent to a washer 191. The rod 189a is arranged to slide within the snap action block 186 and beneath said block the rod 189a carries a spring retainer sleeve 192 within which there is a coil spring 193 located over a sleeve 194 on the rod 189a. Adjacent to the sleeve 194, at its lower end, there is provided a washer 195 and the rod 189a is arranged to hold the washer 195 in place by the rod 189a being fastened by a tongue 196 and a groove 197 and a cross pin 198 to the snap action screw 165. This snap action is shown in detail in my U. S. Patent No. 2,292,546, above referred to.

In the operation of my invention shown in Figs. 1 to 4, when the hand lever 2 is in the middle portion, as shown in Fig. 1, the locomotive is at rest. If it is desired to drive the locomotive forwardly it is moved towards the right in said figure and if it is to be driven rearwardly it is moved towards the left. By the movement of said lever 2 to the right the link or reach rod 12 is moved to the left together with the lever 13. This moves the crank 24 to the right, in Fig. 2, thereby moving the master cylinder piston 31 to the right and simultaneously delivering the liquid under manual pressure by the pipe 56 to the interior of the plunger cylinder 67 while at the same time withdrawing the liquid from the plunger cylinder 66 to the pipe 55. Accordingly, the valve 75, 79 will become seated, thereby unseating the pressure liquid inlet on the tubular valve member 77 and admitting the pressure liquid past this inlet, whence it is delivered by the pipe 99 to the interior of the power cylinder 101 so as to move the piston 118 therein to the right, in Fig. 2, while simultaneously moving the piston 117 in the other power cylinder 97 to the right in said figure. The discharge from the power cylinder 101 is accomplished by the unseating of the valve 75, 79 and the discharge of the liquid by the port 81 to the interior of the casing 21. This movement of the power pistons 117 and 118 results in moving the crank 122 to the right, in Fig. 2, and thereby the shaft 124 so as to move to the left the arm 130 with the travel control pistons 49 and 50 as well as the arm 132. The movement of the arm 132 transmits the motion to the link 135 and thence to the reverse gear of the locomotive so as to shift the radius rod, in the usual way in operating the locomotive reverse gear. At the same time that the power pistons 117 and 118 are moved, as above referred to, the shaft 124, by means of the arm 130, will move the travel control pistons 49 and 50 so that the travel of the rod 135 in either direction will be coordinated to the travel of the master pistons 30 and 31 and, therefore, also to the travel of the manual lever 2 in either direction. It will be understood that the movement of the hand lever 2 towards the left, in Fig. 1, will bring about the reverse series of operations of the parts referred to, in order to drive the locomotive rearwardly. In the operation of the said parts the high pressure liquid is provided to supply the ports 84 and 88 in the valve cylinders, by the compressed air which enters the inlet port 143 past the valve 144, 145 and thence to the air motor 138 which drives the pump gear shaft 137 so as to deliver the high pressure liquid through the pipe 85 for supply to the valve inlet ports 84 and 88. This pressure supply is maintained at a given level of pressure by the pressure accumulator 142 in which the piston 162 accumulates the pressure received from the gear pump by the yielding of the coil springs 170 to such a point that when the desired pressure to be maintained is reached the snap action apparatus in the said accumulator causes the interrupted surface or annular flange 185 to suddenly pass by the rollers 183 so that the end of the sleeve 184 contacts with the plug 155 to close the valve 145, 146, and keep the same closed until the release of the pressure on the base of the piston 162 causes the springs 170 to move the interrupted surface or annular ring 185 back below the rollers 183 by a sudden snap action. The snap action produces a positive and quick opening or closing of the valve 145, 146, thus aiding and maintaining at all times the desired pressure in the supply of high pressure liquid.

While I have described my invention above in detail I wish it to be understood that many changes may be made therein without departing from the spirt of the same.

I claim:

1. In combination, a casing, a source of fluid pressure, work performing pistons, a valve mechanism for controlling the supply of fluid pressure thereto, cylinders for said pistons mounted on opposite sides of the casing, the pistons having a connection to each other within the casing, and master cylinders in the casing, having hydraulic connections to the valve mechanism, for operating the valve mechanism, said casing having therein a work performing element connected to and operable by said connection, and said casing having a make-up passageway in the cylinder wall provided with a port leading from each of said master cylinders.

2. In combination, a casing, a source of fluid pressure, work performing pistons, a valve mechanism for controlling the supply of fluid pressure thereto, cylinders for said pistons mounted on opposite sides of the casing, the pistons having a connection to each other within the casing, master cylinders in the casing, having pistons and hydraulic connections to the valve mechanism, for operating the valve mechanism, said casing having therein a work performing element connected to and operable by said connection and said casing having a make-up passageway in the cylinder wall provided with a port leading from each of said master cylinders, manual control means for said master cylinder pistons and valve mechanism, travel control pistons, having hydraulic connections respectively to the master cylinder pistons and work performing pistons, adapted to coordinate the movement of the control means and work performing pistons, and cylinders for the travel control pistons mounted on said casing.

3. In combination, a casing, a source of fluid pressure, work performing pistons, a valve mechanism for controlling the supply of fluid pressure thereto, cylinders for said pistons mounted on opposite sides of the casing, the pistons having a connection to each other within the casing, master cylinders in the casing, having hydraulic connections to the valve mechanism, for operating the valve mechanism, said casing having therein a work performing element connected to and operable by said connection and said casing having a make-up passageway in the cylinder wall provided with a port leading from each of said master cylinders, and an output lever having a pivot on the casing.

4. In combination, a casing, a source of fluid pressure, work performing pistons, a valve mechanism for controlling the supply of fluid pressure thereto, cylinders for said pistons mounted on opposite sides of the casing, the pistons having a connection to each other within the casing, master cylinders in the casing, having hydraulic connections to the valve mechanism oppositely located travel cylinders having hydraulic connections to said cylinders respectively, for operating the valve mechanism, said casing having therein a work performing element connected to and operable by said connection and said casing having a make-up passageway in the cylinder wall provided with a port leading from each of said master cylinders, and an output lever having a pivot on the casing, the master cylinders and travel control cylinders being located below said pivot.

5. In combination, a casing, a source of fluid pressure, work performing pistons, a valve mechanism for controlling the supply of fluid pressure thereto, cylinders for said pistons mounted on opposite sides of the casing, the pistons having a connection in and passing through the casing, oppositely located master cylinders, having hydraulic connections to the valve mechanism, for operating the valve mechanism, oppositely located travel cylinders having hydraulic connections to said cylinders respectively, an output lever having a pivot on the casing, and a lever on said pivot leading to said piston connection, the master cylinders and travel control cylinders being located below said pivot, each of two opposite sides of said casing having a master cylinder and a travel control cylinder in a single block.

EDWARD A. ROCKWELL.

REFERENCES CITED

The following references are of record in the file of this patent:

UNITED STATES PATENTS

| Number | Name | Date |
|---|---|---|
| 692,868 | Lemp | Feb. 11, 1902 |
| 752,491 | Warren | Feb. 16, 1904 |
| 897,907 | Lang | Sept. 8, 1908 |
| 1,062,561 | Williams et al. | May 20, 1913 |
| 1,147,436 | Ragonnet | July 20, 1915 |
| 1,299,284 | Baader | Apr. 1, 1919 |
| 2,061,120 | Vorech | Nov. 17, 1936 |
| 2,109,114 | Kerr | Feb. 22, 1938 |
| 2,236,467 | Clench | Mar. 25, 1941 |
| 2,239,893 | Jackman | Apr. 29, 1941 |
| 2,252,660 | Kulikoff | Aug. 12, 1941 |
| 2,261,444 | Neubert | Nov. 4, 1941 |
| 2,286,661 | Warner | June 16, 1942 |
| 2,365,247 | Carlton | Dec. 19, 1944 |
| 2,458,736 | Rockwell | Jan. 11, 1949 |

FOREIGN PATENTS

| Number | Country | Date |
|---|---|---|
| 374,583 | Great Britain | June 16, 1932 |
| 710,182 | France | June 1, 1931 |
| 702,983 | Germany | Feb. 25, 1941 |